US005104719A

United States Patent [19]

Kamen et al.

[11] Patent Number: 5,104,719

[45] Date of Patent: Apr. 14, 1992

[54] HEAT ACTIVATED, QUICK RELEASE DECALS AND ASSOCIATED METHODS

[75] Inventors: Melvin E. Kamen, Highlands; Bhupendra Patel, Edison; Augustine DeFazio, Englishtown, all of N.J.

[73] Assignee: Revlon, Inc., New York, N.Y.

[21] Appl. No.: 400,592

[22] Filed: Aug. 30, 1989 (Under 37 CFR 1.47)

[51] Int. Cl.[5] .................... B32B 9/00

[52] U.S. Cl. .................... 428/195; 428/204; 428/207; 428/211; 428/913; 428/914; 428/40; 156/60; 156/233

[58] Field of Search .................... 428/204, 207, 211, 913, 428/914, 195, 40; 156/60, 233

[56] References Cited

U.S. PATENT DOCUMENTS

| | | | |
|---|---|---|---|
| 4,421,816 | 12/1983 | Arnold | 428/202 |
| 4,517,044 | 5/1985 | Arnold | 428/202 |
| 4,532,167 | 7/1985 | Mohr | 428/78 |
| 4,645,556 | 2/1987 | Waugh et al. | 428/31 |

FOREIGN PATENT DOCUMENTS 0100658 2/1984 European Pat. Off. .

*Primary Examiner*—Patrick J. Ryan
*Attorney, Agent, or Firm*—Julie Blackburn

[57] ABSTRACT

A decal which is adapted to decorate bottles, containers and similar devices of the type having surfaces with high wetting angles is fabricated without the use of wax. The decal can be printed upon utilizing various inks to provide aesthetic container surfaces as for example utilized in the cosmetic industry. The decal is free of wax and consists of a carrier layer as a plastic or paper having impressed thereon a base and a release layer which typically is a suitable plastic type material. The plastic type material as secured to the base layer has imprinted thereon a suitable pattern employing an ink which can contain metallic pigments or other piggments. The printed pattern has deposited thereon an adhesive layer which is relatively thin and which layer is secured to a desired surface of the container at low temperatures. After securing the decal to the surface of the container the release and base layers are removed thereby leaving the printed matter on the surface of the container.

27 Claims, 1 Drawing Sheet

HEAT ACTIVATED, QUICK RELEASE DECALS AND ASSOCIATED METHODS

BACKGROUND OF THE INVENTION

This invention relates to decals adapted for application to various container surfaces and, particularly, to heat activated and actinic radiation curable, wax-free, quick release decals.

It is well known throughout the cosmetic industry, as well as many other industries, that many containers are widely employed in the packaging of numerous products. Certain of these containers are fabricated from glass, while others are fabricated from various plastics. It is extremely difficult to print or otherwise impress indicia on such containers, due to the fact that the surfaces are extremely smooth, with low coefficients of friction and extremely high wetting angles.

As one can ascertain, a typical technique for applying a label or logo to a glass bottle employs an adhesive backed label whereby the label may be fabricated from paper or some other material and then is actually pasted or glued to the surface of the bottle. The same approach has been employed to place labels on plastic containers and so on.

As one can understand, a pasted on label does not present a particularly attractive appearance, as compared to directly printing indicia on the surface of the bottle or container. Particularly, in the cosmetic industry wherein expensive products such as perfumes, shampoos or other highly sophisticated products are utilized, one would desire to provide labels or indicia associated with the container which present an attractive format and which avoids paste on labels. As one can ascertain, various techniques have been employed in the cosmetic industry as attempts to provide such products. A very popular technique employs a decal. Such decals are provided by a company called Dennison and are sometimes referred to as the Dennison decal. Such decals, while providing a good appearance, have many problems associated therewith. A typical decal found in the prior art typically consists of a paper or Mylar (polyethylene terephalate) backing having superimposed thereon a layer of wax upon which an ink is utilized to imprint the various indicia and logos. The ink is covered by a sizing or adhesive. The layer of wax which is an integral part of such decals creates many problems such as, in particular, its tendency to dull various ink pigments. The wax is extremely detrimental when employed with metallic pigments and serves to reduce the luster and general effect of such pigments. Apart from the foregoing is the further problem that the wax coats the ink pigments producing many undesirable visual effects such as providing a dull, non-uniform finish and otherwise yielding a less than aesthetically desired product.

Generally, there also are pressure sensitive decals which exhibit great difficulties in application. As such, prior art decals are difficult to register, with respect to containers, and are of relatively high cost. The techniques of applying such decals substantially increase production time thereby increasing product cost. Accordingly, it is desirable to produce a decal which is relatively inexpensive, yet capable of accommodating all types of ink pigments, when applied to a container, with optimum registration, and which provides indicia directly coupled to the surface of a container. It is understood that prior art labels as pressure sensitive labels are difficult to align and register with container surfaces.

It is also desirable to be able to provide a decal which can utilize modern printing techniques such as silk screen, gravure, offset, flexo, heliographic or electrostatic assist techniques. In regard to this, it is therefore desirable to produce a decal which will enable one to print on the decal using the above-mentioned modern techniques and for example, apply the decal to various containers by means of conventional application techniques. The printing step, is invention, can be carried out by utilizing the Kammann which is supplied by the Kammann Company of West Germany and is extensively employed. In addition to functioning as a high speed printing machine, the Kammann press is designed to fabricate conventional multilayer decals by sequentially applying the varied coatings at separate stations. Futhermore, the inventors herein have discovered that upon further modifications, the Kammann press can be adapted to sequentially cure the thermoactivatible layers, in accordance with this invention, as described hereinbelow.

It is a further object to provide a decal which can be applied to a container surface at a relatively low temperature and at a relatively high speed and which decal can be applied with exact registration to thereby yield an aesthetically desired finished product at reduced cost.

BRIEF DESCRIPTION OF THE PREFERRED EMBODIMENT

A decal apparatus for applying indicia to the surface of a container, comprising a supportive base layer, a first intermediate layer secured to said base layer and fabricated from a printable material, a second intermediate layer comprised of a printed graphic data located on said intermediate layer formed thereon by the use of an ink having some pigment therein, an adhesive layer covering said printed graphic data and fabricated from a low melting point, colorless adhesive, with said adhesive adapted when melted to secure said decal to said container surface to enable said printed data to remain on said surface after removal of said base and first intermediate layers.

BRIEF DESCRIPTION OF THE FIGURE

The sole figure depicts a cross section of a heat activated quick release decal according to this invention.

DETAILED DESCRIPTION OF THE FIGURE

Figure 1:
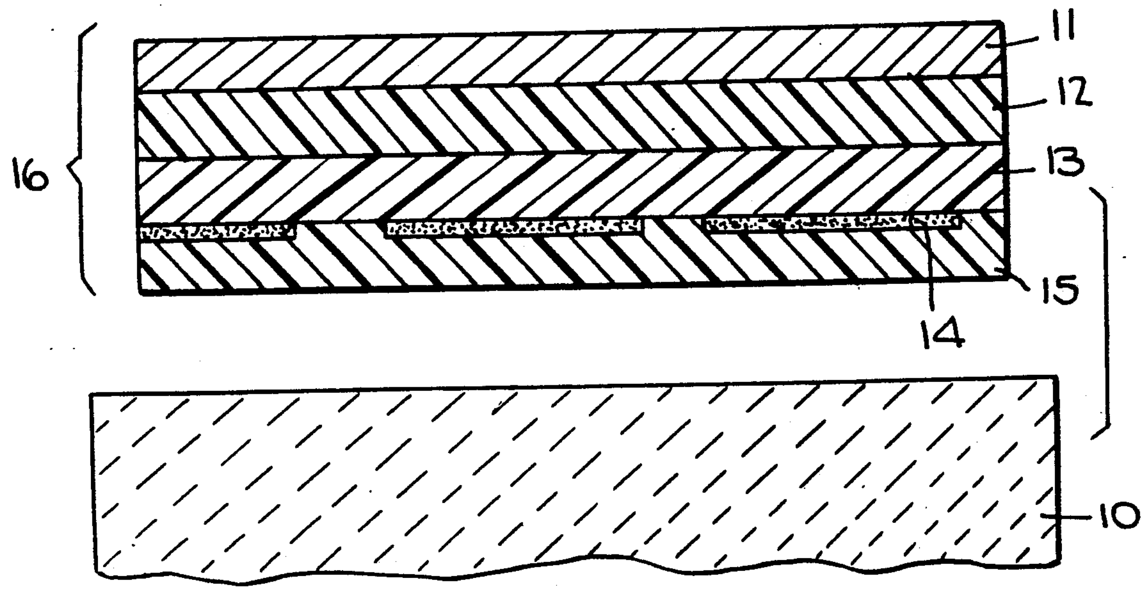

Referring to the sole figure, there is shown a container surface 10 which is associated with a glass or a plastic container. The surface 10 may be a surface of a cosmetic container or any container.

The container surface 10 as indicated above has a low coefficient of friction and is relatively difficult to print on or otherwise adhere printed graphic data thereto. There are many substances that are very difficult to wet. A perfect example of such a substance is polyolefins. Accordingly, not too many liquids adhere to such substances and therefore it is extremely difficult to print or to paint on a Teflon (Tetrafluroethylene) surface or another surface where the wetting capability is difficult. To achieve adequate adhesion and smoothness, a coating such as a paint or printing ink must possess an out-of-phase surface tension which is lower than the critical surface tension of the substrate or surface to which it is being applied. Furthermore, the ultimate critical surface tension of the coating should be lower than that of the substrate, if direct adherence of the ink or paint to the respective substrate is to be achieved. This aspect of surface tension in regard to printing on a substrate has been thoroughly investigated in the prior art. See for example, the text entitled *Contact Angle Wettability and Adhesion,* published by the American Chemical Association, R.F. Gould, editor, 1964, Title 43 of Advances in Chemistry, Series 43. As one can ascertain, this text and other articles describe the problems concerned with applying coatings to surfaces in regard to surface tension and other considerations as well.

A further reference is that of Zigman, Advances in Chemistry, Series, Ch.1, Equilibrium contact angle, wherein the relationship between adhesion and "wetting angle" (contact angle) or decreased surface free energy is defined as follows:

The wetting angle (contact angle) is the measurement angle between a liquid and solid, i.e., substrate surface. This measurement gives an indication of the relative values of the forces of adhesion and cohesion that result in interfacial tension. As referred to herein, the term "wetting angle" describes the ability of a specified solid to be wet by a specific liquid under defined conditions. Thus, the greater the "wetting angle", the lower is the "wettability" of that solid surface by the specified liquid.

The wettability of a surface is also a function of the relative polarity of the coating, with respect to the substrate. Hence, as one can ascertain, the container 10 may be a suitable surface of a bottle or container and has difficulty in receiving a proper ink, a decal or certain adhesives. It is well known throughout the realm of glass technology that there are many adhesives which are completely compatible with and will adhere to glass. In any event, these adhesives are secured to paper or other labels which are not desirable to use with cosmetic products.

Apart from a glass or a polyolefin surface, there are many other materials which are widely employed in containers but extremely difficult to adhere to. Examples of such materials are polypropylene, polyethylene, polystyrene, polyvinylchloride, polyethylene terephthalate, acrylonitrobutadiene styrene as well as various acrylics which have large molecular structures. In order to print directly on such surfaces, certain techniques have been employed in the prior art. For example, on a polyethylene container, one may use a flame or corona to clean the surface and then transfer print onto the surface. In any event, there is a desire to print on a surface, but the printing should be registered, with respect to the container surface and hence properly aligned. Hence, any written material to be imprinted on a substrate surface should be registered on the surface and should be firmly secured thereto via a cohesive bond. In this manner the indicia is firmly secured to the surface and will not rub off and could not be torn off as a label.

As shown in the accompanied drawing identified as FIG. 1, an improved decal, according to this invention is formed as follows: The decal includes a flexible supportive base or carrier layer 11. The flexible supportive base layer 11 may be of conventional paper, a silicone treated paper, cardboard, or a suitable plastic such as Mylar (polyethylene terephthalate). Bonded to said supportive base layer 11 by means of conventional techniques is a first intermediate layer 12 essentially comprised of a thermally curable or an actinic radiation curable monomer. Said first intermediate layer is a multi-functional, non-blocking, i.e., non-ink receptive coating, which forms a flexible protective coating over the printed material 14 described hereinbelow. For the purposes of this invention, it is preferred that said first intermediate layer 12 be an acrylic compound having the properties described herein. Acrylic compounds are well known and, as such, are often employed as release coatings for decals.

Secured to the surface of the first intermediate layer 12 is a base coat layer 13 which essentially operates to protect the decal prior to application. Upon curing, said first intermediate layer 12 and said base coat layer 13 are cohesively bonded to each other. Accordingly, in an alternate embodiment of the present invention, said first and second intermediate layers, 12 and 13, respectively, could be applied simultaneously as a single acrylic layer rather than two separate layers. Typical graphics or indicia designated as 14 in the drawing appended hereto can be printed directly on the base coat layer 13 which is an integral part of said first intermediate layer, by means of an ink. The graphics 14 are printed on the second intermediate layer 13 by means of conventional printing techniques utilizing conventional inks and pigments. One can use inks containing metallic pigments to print on said base coat layer 13. The imprinted graphics 14 is covered by a thin adhesive coating 15 which is comprised of a thermoplastic, i.e., hot melt adhesive.

Among the preferred thermoplastic materials which are useful as the hot melt, adhesive layer 15, in accordance with this invention, are included EVA, PVC, and polyamide. Such thermoplastic materials are commercially available and have been widely employed as hot melt adhesives in numerous industries as well as that of cosmetic products. The foregoing hot melt adhesives have extremely low melting points, are orderless, clear, and chemically inactive. Hence, they do not interfere with or contaminate the ink or graphics 14. The hot melt adhesive 15 is utilized to secure the printing 14 directly to the container surface 10. The coating adhesive layer is placed contiguous to the container surface and adequately heated to melt, i.e., cure, the adhesive. The layers 11, 12, and 13 are removed after the adhesive cures. The thusly cured adhesive provides a strong bond thus enabling the base coat layer 13 to be removed, and hence allowing the data to remain on the container surface. After the adhesive layer 15 is secured to the surface 10 by subjecting the decal 16 to a melt temperature by a conventional means of heating such as a thermal chamber, i.e., oven, or a high intensity heat lamp, the base coat 13 is removed together with the release coat 12 and the backing, i.e., first intermediate layer 11. The layers 11, 12 and 13 are peeled from the surface 10 with the graphic pattern 14 adhering thereto.

A further alternate embodiment of the present invention involves the use of a decal apparatus having at least one ultraviolet light curable layer such as that of the first intermediate layer 12, in combination with one or more subsequently applied thermally curable layers such as those of the second intermediate layer 13 and the adhesive layer 15. In such instances, the similarly curable layers must be contiguous and the respective curing steps are carried out sequentially with the ultraviolet light curing preceding the thermal curing. In all situations, the graphic material 14 is applied onto the second intermediate layer 13.

For the purposes of this invention included among the thermally curable and actinic radiation, i.e., ultraviolet light, curable vinyl acrylic monomers are compounds such as substituted acrylic acids and crotonic acid; acrylate esters such as alkyl acrylates having between 1 and 20 carbon atoms in the alkyl group; methacrylate esters having between 2 and 20 carbon atoms in the alkyl group, for example, hydroxypropyl methacrylate and hydroxybutyl methacrylate; esters of acrylic acid or substituted acrylic acids with polyhydroxy compounds such as the diesters of acrylic acid with alkylene glycols having 2 to 20 carbon atoms in the alkylene portion of the molecule; diesters of acrylic acid with polymethylene glycols and polyoxalkylene glycols; and the tri- and tetra-esters of acrylic acid with pentaerythritol.

Those skilled in the art will recognize that the photoinitiated vinyl and acrylic polymerizations of the present invention are of the controllable free-radical type in which crosslinking occurs. The useful acrylic monomers are those of the chemical species having a terminal acrylate group, i.e., a group that is not bound in the center of a chain of monomers, but has its ethylenically unsaturated group either at one end of a branch, in the case of incorporation in a large polymeric molecule, or otherwise isolated at the end of a molecule.

Among the preferred compounds useful for the preparation of both the first and second intermediate layers, in accordance with this invention, are polyvinyl chloride, styrene, polysiloxanes polyurethane, methylmethacrylate, the copolymers thereof as well as other crosslinkable monomers.

In particular, among the preferred ultraviolet light curable compounds useful in the preparation of the adhesive layer 15, in accordance with this invention are the silicone acrylates i.e., polysiloxanes, polyester acrylates, and urethane acrylates which are used in combination with photoinitiators derived from ketones and amines.

The ultraviolet light curable polysiloxanes which are useful as release coatings i.e., first intermediate layer 12 according to this invention are those of the commercially available type produced by the Th. Goldschmidt AG Company of West Germany. The silicone release coatings are those such as the linear dimethyl polysiloxanes which can be crosslinked thoroughly or by means of condensation or additional processes.

In the condensation process the —OH (alcohol) difunctional polysiloxane is crosslinked by alkoxy or hydrogen functional silicone compounds. Therefore byproducts of condensation are ROHs (alkyl alcohols), RCOOH (carboxylic acid) or hydrogen. The catalyst usually consists of soluble tin derivatives.

In the addition process the main reaction is the crosslinking of vinyl-functional silicone with the hydrogen functional silicone compound. Catalysts herein are of the platinum group. In order to prevent premature catalytic reaction, inhibitors must be added. These inhibitors release the catalysts by the effect of heat or U.V. light. In this process the temperature is approximately 100° Centigrade. The process may be carried out with or without solvents. With solvents, it is thermal.

The curing step of the actinic radiation curable systems according to this invention can be carried out by suitable conventional means such as U.V. light, laser, or electron beam. The U.V. light induced reactions require photoinitiators. These photoinitiators form the radical by absorbing the light from the U.V. source and crosslinking acrylate. Electron beam does not require photoinitiator (high-energy inert atmosphere such as nitrogen or any other suitable compound except oxygen). (The reference source of the foregoing discussion of U.V. curable compounds is the Goldschmidt Informit No. 65.

Among the preferred photoinitiators useful in the preparation of the adhesive layer 15, in accordance with this invention, are included ketone, amide, ethyl amide and amine.

In the preparation of the second intermediate layer which, in essence, forms a protective coating over the printed material, it is preferred that an acrylic compound or nitrocellulose be employed.

Regarding said adhesive layer 15 which bonds said second intermediate layer 13 having the graphics 14 printed thereon, to the substrate surface of the container 10, it is preferred that the useful thermoplastic materials include polyester acrylates, urethane acrylates, and polysiloxane acrylates.

As one can ascertain, the entire decal structure shown and described contains absolutely no wax and essentially is a four component decal structure utilizing an adhesive, i.e., second intermediate, layer 15 as the interface which secures the printed graphics 14 on the base coat layer 13 to the surface 10 of the container. It is understood that the layer 12 designated as the first intermediate layer and the second intermediate layer 13 can be the same exact material and essentially can constitute one layer. The second intermediate layer 13 has imprinted thereon by means of any type of ink 14 a suitable pattern. The adhesive layer 15 which may be ethylene vinyl acetate (EVA) or polyamide operates to secure the printed matter and the base coat to the surface of the container 10. While EVA may be employed, any adhesive such as a polyamide, vinyl acetate, polyvinyl chloride or any other adhesive which operates to liquefy at a low temperature (between 100° and 150° C.) can be employed. It is further indicated that the container surface 10 can be further treated by subsequent flame treatment and so on to enable a stronger bonding of the decal indicia.

Due to the fact that the decal has no waxes, any metallic pigment can be utilized in the ink. One can further form the printed, graphic indicia 14 by means of the ink on the surface of the base coat 13 by using any type of printing process such as silk screening, gravure, offset, flexo, heliographic, letter press, electrostatic assist in mold decorating as well as other techniques. In regard to the above, one can print on the base coat layer 13 with typical inks by means of various printing presses such as off presses or on presses. The base coat layer 13 may also consist of other types of materials apart from acrylics such as paper which is coated with silicone or siloxane, and, essentially, the ink i.e., graphics printed thereon.

The ink can be applied utilizing conventional silk screen techniques or can be rolled on by various other conventional techniques. For the purposes of this invention commercially available, general purpose type inks can be utilized. Among the useful inks are included the gloss vinyl lacquer type produced by the Ink Dezyne Company. These inks which are readily adaptable to hand or machine printing, were primarily formulated for outdoor use on self-adhesive vinyl "decals" While the present invention relates to the use of conventional type inks only, those skilled in the art will recognize the usefulness of ultraviolet light curable inks.

As one can understand, by applying suitable temperatures to liquefy the hot melt adhesives 15 the ink pattern is intimately secured to the surface of the container. The layers 12 and 13 are peeled, stripped or removed together with the paper backing. Thus, the so-called decal as shown in the figure is adapted to decorate bottles, containers and the like especially those made from plastic or glass as indicated above and especially those which are extremely difficult to wet. Because the decals are wax free, metallic pigments can be employed without experiencing the dulling problems associated with prior art wax based decals. The decals may include indicia printed thereon in multiple colors which can then be transferred to the surface of a bottle or container in a one step operation enabling faster and more efficient process and control than that available in the prior art. Based on the nature of the decal, it is extremely simple to register using modern registration machinery such as the Kammann press as indicated above. Based on the elimination of wax, the printed matter as secured to the surface of the container exhibits good contrast and substantially eliminates the rainbow effect.

Prior art decals employing wax provided indicia which refracted light; therefore when one would look at the prior art displays, one would see a rainbow-like effect emanating from the container surface. As indicated, the decal shown above eliminates the wax and therefore the dulling and side effects associated with wax. The typical hot melt adhesive 15 can be liquefied at temperatures between 100° and 115° C. The adhesive 15 allows the print pattern to stick with low resistance to the low wettability surface 10. There is no sizing which is necessary to form the decal and hence no wax or other sizing which would contaminate inks. There is no hot stamping required and very little heat is needed to secure the decal to the container surface. In this manner, multiple colors can be employed for the ink 14 which colors can be applied in exact registration as it is well known to register such colors on layers as 12 and 13 of Mylar, styrene, acrylic as well as employing such layers for silk screening processes.

In this manner one can form and apply the decals rapidly using conventional equipment without any of the deleterious affects attendant or otherwise incidental to prior art decal techniques.

It will be understood that the embodiments described herein are merely exemplary and that a person skilled in the art may make many variations and modifications without departing from the spirit and scope of the invention.

As noted, the free-radical polymerization with the present photocurable compositions is conducted after it has been coated onto the surface of the desired substrate. The substrate surface may or may not be planar i.e., formed into a shaped article such as a cylindrical container. This sequence of steps is preferred, when the particular coating is intended for a non-adhesive use, e.g., a protective coating, a gloss varnish-like overcoating, etc. On the other hand, since these uncured photocurable coating compositions display appreciable tack, tension and cohesive characteristics, it is preferred that a removable cover sheet be utilized, whenever it is elected to delay curing for a considerable period. In accordance with the present inventions, it is an additional function of the first intermediate layer 13 (identified as such in the accompanying drawing), to ultimately provide a protective over-print varnish for the printed graphics.

The following examples further illustrate certain aspects of the present invention and are not intended to limit the scope thereof to such.

EXAMPLE I

A heat activated, quick release decal was prepared and applied to the surface of a polypropylene container, in accordance with the present invention, utilizing the apparatus intended therefor as described in conjunction with the sole figure hereinabove.

A thermally curable, quick release decal was prepared as follows:

In this instance, the supportive base substrate 11 was comprised of mylar (polyethylene terepthalate). Onto said mylar base substrate was applied the first intermediate layer 12 essentially comprised of methylmethacrylate. Thereafter a second intermediate layer 13 similar to said first alkylacrylate first intermediate layer, having ink graphics 14 printed thereon, was applied onto said first intermediate layer. The ink utilized herein was that of a commercially available formulation which is particularly useful for printing on untreated polypropylene and produced as CP-1... by Ink Dezyne Company.

Onto said second intermediate layer was applied an air-dryable adhesive composition comprised of a mixture of about, in equal proportions of approximately 21.28 percent, by weight, each of N-butanol, ethyl acetate and isopropyl alcohol. To the foregoing mixture was added about 0.28 percent of Aerosil 200 (Degussa) and a combination of three modified polyamides in an amount of about 31 percent of the total weight of the adhesive composition.

The thusly prepared decal was then placed onto the outer surface of a polypropylene container whereupon the varied layer thereof were thermally cured by means of a conventional gravure press within a thermal chamber. Shortly thereafter the mylar substrate having the cured methylmethacrylate first intermediate layer bonded thereto, was stripped-away, thus, leaving a smooth, wax-free printed indicia uniformly registered on the surface of the polypropylene container.

EXAMPLE II

The procedural steps outlined in Example I hereinabove were repeated, except in this case, the surface of the receptive substrate, i.e., container was comprised of a vinyl-based material.

In this instance, the adhesive composition applied onto said second intermediate methymethacrylate layer essentially comprised, by weight, approximately 67.5 percent of polymethyl methacrylate, 15.4 percent each of a resinous vinyl and N-butanol, respectively, and about 1.5 percent of BYK 053 (BYK-Chimie).

Upon placing the above-prepared decal onto the wall of the vinyl-based container and subsequently thermally curing said decal, it was observed that results similar to those described in Example I hereinabove were obtained.

EXAMPLE III

A quick release decal having combined ultraviolet light curable release coating, i.e., first intermediate layer 12 and subsequently, thermally curable second intermediate layer 13 and adhesive layer 15, in accordance with this invention, was prepared to demonstrate the adaptability of the method utilized therefor to a Kammann press. As discussed hereinabove the Kammann press is utilized to apply the graphic indicia 14 onto the second intermediate layer 13.

In this instance, a mylar (polyethylene terephthalate) substrate 11 was fed into the Kammann press wherein an ultraviolet light curable first intermediate layer, i.e. release coating, 12 was applied to said mylar substrate. The U.V. curable composition comprised the following components in amounts by weight, of the total composition: about 73% of a linear dimethylpolysiloxane resin about 24% of (UvaCure 29-2) a commercially available polysiloxane about 1.5% of (Goldschmidt A-2) a commercially available crosslinking photoinitiator produced by the Goldschmidt Company of West Germany, and about 1.5% of (Goldschmidt 905 surfactant). The foregoing reaction mixture was screened with a 300 mesh screen and thereafter, using the Kammann press, applied onto the mylar substrate to a thickness of about 1.0 mm. Shortly thereafter the polysiloxane release coating 12 was cured by exposure to a U.V. lamp within the Kammann press. The U.V. exposure was carried out a wavelength between 260 and 405 nanometers at about 200 watts per inch over a period of about 15 seconds. Thereafter, a series of thermally curable alkylacrylate compositions intermediate layers similar to that of the second intermediate layer 13, i.e. base coat and protective layer in Example I hereinabove, each having separate and distinct graphic ink material printed thereon similar to that identified as 14 in the aforesaid Example were sequentially applied onto said U.V. cured release coating 12, at various stations within the Kammann press. In each instance of the foregoing sequential applications, methylmethacrylate was utilized as the alkylacrylate, and an ink having a metallic pigment therein, to form the respective graphic materials. Then a thermally curable adhesive layer 15 similar to that described in Example I, supra, was applied onto the last of the alkylacrylate composition intermediate layers. The thusly assembled decal apparatus was thereafter affixed to the wall of a polypropylene container by simultaneously, thermally curing the series of alkylacrylate composition layers and the adhesive layer. The thermal curing step was carried out by means of a heat lamp within the Kammann press at a temperature of about 130°. Centigrade over a period of about 3 minutes. The resultant wax-free decal exhibited the desired characteristics of excellent registration, uniform color, and smoothness.

Summarizing, it is thus seen that this invention provides novel, thermally curable and actinic radiation curable, wax-free, quick release decals which are usual on a variety of substrate surfaces. For example, the novel wax-free, quick release decals disclosed herein are readily applicable to substrate materials such as glass, wood, metals and plastics, including polypropylene, polyethylene, vinyl-based materials, etc. Furthermore, the decal apparatus of the present invention can be readily utilized in modern printing techniques such as silk screen, gravure, offset, flexo, heliographic or electrostatic techniques. Of particular interest is the tremendous cost and cutting method offered by the use of acitinic radiation, i.e., ultraviolet light curing methods.

Based on the disclosure set forth hereinabove it will become apparent to those skilled in the art that various modifications in procedures, proportions, and materials may be made, without departing from the scope and spirit thereof, as defined by the following claims:

We claim:

1. A wax-free decal for applying indicia to the surface of a container, comprising:

a supportive base layer, an intermediate layer secured to said supportive base layer, which intermediate layer is a thermally curable or actinic radiation curable monomer selected from the group consisting of a vinyl acrylic monomer selected from the group consisting of substituted or unsubstituted acrylic acids and crotonic acids; alkyl acrylate esters having 1–20 carbons int he alkyl group, methacrylate esters having 2–20 carbons in the alkyl group, hydroxypropyl methacrylate, hydroxy butyl methacrylate, esters of acrylic acid, substituted acrylic acids with polyhydroxy compounds, diesters of acrylic acid with alkylene glycols having 2 to 20 carbons in the alkylene chain, diesters of acrylic acid with polymethylene and polyoxyalkylene glycols, tri-and tetra-esters of acrylic acid with pentaerythrisol, styrene, and polysiloxane, PVC, urethane, or methylmethacrylate having thereon at least one layer of printed graphic data formed of an ink having at least one pigment therein, and a quick-releasing colorless adhesive selected from the group consisting of EVA, PVC, polyamide, polyester acrylate urethane acrylate, polysiloxane acrylate, or vinyl acetate, polymethyl methacrylate a resinous vinyl, N-butanol and a cross linking agent applied to said intermediate layer which adhesive melts between 110°–150° C.

2. The decal according to claim 1 wherein said supportive base is essentially comprised of a paper product.

3. The decal according to claim 1 wherein said supportive base is comprised of a plastic material.

4. The decal according to claim 1 wherein said intermediate layer comprises a first layer which is a thermally curable or actinic radiation curable monomer and a second layer which is thermally curable or actinic radiation curable monomer, with said layer of printed graphic data secured to said second layer.

5. The decal according to claim 1 wherein said ink is a ink having a metallic pigment therein.

6. The decal according to claim 1 wherein said supportive base is essentially comprised of a paper product having a silicone coating thereon.

7. The decal according to claim 1, wherein said adhesive layer is a polyamide.

8. The decal according to claim 1 wherein said adhesive is Ethylene Vinyl Acetate.

9. The decal according to claim 1 wherein said adhesive layer is essentially comprised of polymethyl methacrylate, a resinous vinyl, N-butanol and a crosslinking agent.

10. A method for the preparation of a wax-free decal for applying indicia to the surface of the container comprising the steps of:

(a) applying a first intermediate layer comprised of a thermally curable or actinic radiation curable monomer selected selected from the group consisting of onto a supportive base layer, (b) applying onto said first intermediate layer a second intermediate layer comprised of a thermally curable or actinic radiation curable monomer having thereon a printed graphic data formed of an ink having at least are pigment therein, onto said first intermediate layer; and then (c) applying a quick-releasing colorless thermoplastic adhesive selected from the group consisting of EVA, PVC, polyamide, polyester acrylate, urethane acrylate, polysiloxane acrylate, vinyl acetate, polymethylmethacrylate a resinous vinyl, N-butanol and a cross linking agent which melts at 110°-150° C. onto said second intermediate layer.

11. The method according to claim 10 wherein said first intermediate layer is an ultraviolet light curable composition.

12. The method according to claim 10 wherein said first intermediate layer is comprised of at least one ultraviolet light curable vinyl acrylic monomer selected from the group consisting of compounds such as substituted acrylic acids and crotonic acid; acrylate esters such as alkyl acrylates having between 1 and 20 carbon atoms in the alkyl group; methacrylate esters having between 2 and 20 carbon atoms in the alkyl group, for example, hydroxypropyl methacrylate and hydroxybutyl methacrylate; esters of acrylic acid or substituted acrylic acids with polyhydroxy compounds such as the diesters of acrylic acid with alkylene glycols having 2 to 20 carbon atoms in the alkylene portion of the molecule; diesters of acrylic acid with polymethylene glycols and polyoxalkylene glycols; and the tri- and tetra-esters of acrylic acid with pentaerythritol.

13. The method according to claim 10 wherein said first intermediate layer is comprised of polysiloxane.

14. A method of fixing label-type indicia to the surface of a container having a high wetting angle, comprising the steps of:

printing indicia upon a non-wax layer comprised of a thermally curable or actinic radiation curable monomer which is secured to a supportive base layer, using an ink having a metallic pigment therein, cover said printed indicia with a layer of adhesive, with a melting point of 110°-150° C. selected from the group consisting of EVA, PVC, polyamide, polyester acrylate, urethane acrylate, polysiloxane acrylate, vinyl acetate, a resinous vinyl, N-butanol and a cross linking agent, and placing said adhesive layer contiguous to said container surface and thermally activating said adhesive layer so as to affix said indicia to said container and then, removing said supportive base layer.

15. The method according to claim 14, wherein said supportive base layer comprises a paper product.

16. The method according to claim 14, wherein said ink contains metallic pigments.

17. The method according to claim 14, wherein said step of printing includes silk screening said indicia on said non-wax layer.

18. The method according to claim 14, wherein said step of printing includes offset printing said indicia on said non-wax layer.

19. The method according to claim 14, wherein the step of printing includes flexo printing said indicia on said non-wax layer.

20. The method according to claim 14, wherein the step of printing includes heliographically printing said indicia on said non-wax layer.

21. The method according to claim 14, wherein said step of printing includes electrostatically printing said indicia on said non-wax layer.

22. The method according to claim 14, wherein said step of printing includes letter press printing said indicia on said non-wax layer.

23. The method according to claim 14, wherein said step of printing includes in mold decorating said indicia on said non-wax layer.

24. The method according to claim 14, wherein said container is fabricated from glass.

25. The method according to claim 14, wherein said container is fabricated from metal.

26. The method according to claim 14, wherein said container is fabricated from a plastic selected from the group consisting of polypropylene, a polyethylene, or a polystyrene.

27. The method according to claim 14, wherein said container is fabricated from a plastic selected from PVC, PETG, PET, ABS or an acrylic.

* * * * *